UNITED STATES PATENT OFFICE.

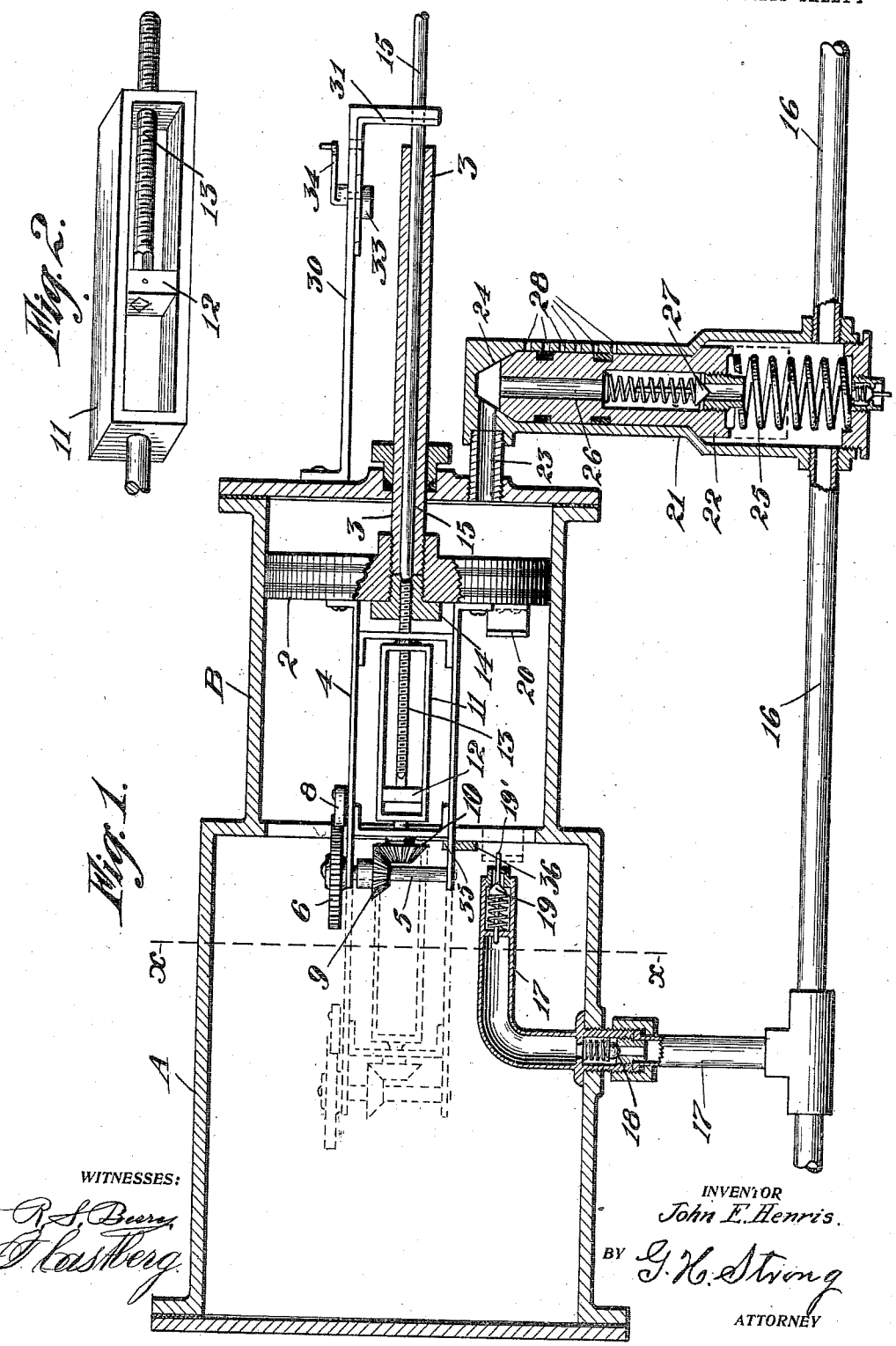

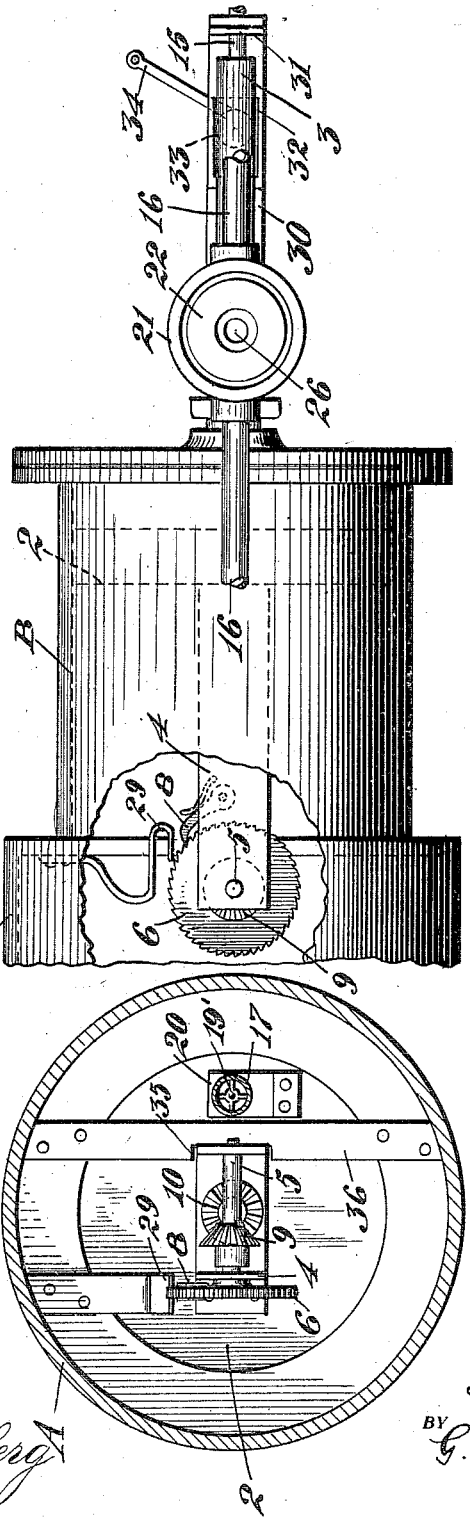

JOHN E. HENRIS, OF SAN FRANCISCO, CALIFORNIA.

AIR-BRAKE.

973,194.  Specification of Letters Patent.  Patented Oct. 18, 1910.

Application filed May 11, 1910. Serial No. 560,597.

*To all whom it may concern:*

Be it known that I, JOHN E. HENRIS, citizen of the United States, residing at the city and county of San Francisco and State of California, have invented new and useful Improvements in Air-Brakes, of which the following is a specification.

This invention relates to air brakes and particularly pertains to the brake cylinder of the automatic air-brake system.

It is the object of this invention to provide an air-brake which is applicable to the ordinary air-line system now generally in use for operating and controlling the brakes on railway trains and the like.

A further object is to provide a simple and practical means in the brake cylinder by which the slack in the brake rod, due to the wearing of the brake shoes, can be automatically taken up.

A further object is to provide means by which the brakes may be retained in a set position while the brake cylinder is being recharged, and means for recharging the brake cylinder, by which the triple valve now commonly used may be dispensed with.

The invention consists of the parts and the construction and combination of parts as hereinafter more fully described and claimed, having reference to the accompanying drawings, in which—

Figure 1 is a horizontal, longitudinal section of the invention. Fig. 2 is a detail of the slack adjuster. Fig. 3 is a cross-section on the line X X, Fig. 1. Fig. 4 is a partial side elevation with parts broken away.

In the drawings the brake cylinder is shown as consisting of a large cylinder A and a smaller cylinder B axially in line with, and open to, each other. A piston 2 fits and is movable in the smaller cylinder B, and is provided with a tubular piston rod 3 which extends through a suitable stuffing-box on the end of the cylinder B. The front end of the piston 2 carries a frame 4 projecting outwardly therefrom, on the outer end of which a shaft 5 is mounted. This shaft 5 extends laterally of the axial line of the cylinders A—B and carries a ratchet wheel 6 securely mounted on one of its ends. The ratchet wheel 6 is limited to movement in one direction by means of a spring-depressed pawl 8 mounted on the frame 4. A beveled pinion 9 on the shaft 5 engages a like pinion 10, which is mounted on a revoluble slideway 11 carried by the frame 4. A crosshead 12 is mounted in the slideway 11 and is secured to the end of a threaded rod 13 which extends through a threaded bearing 14 in the piston head 2 into the interior of the tubular piston rod 3, where it is adapted to contact with the end of a brake rod 15. This brake rod 15 extends into the outer end of the tubular piston rod 3 and is provided at its outer end with the usual brake levers not necessary to be here shown.

The service pipe or train-line is indicated at 16, to which air pressure may be supplied and regulated in any suitable manner. Air is admitted to the interior of cylinder A in front of the piston 2 from the train-line 16 through a supply pipe 17 which is fitted with a check valve 18. The supply pipe 17 extends into the interior of the cylinder A beyond the check valve 18 and terminates near the mouth of the cylinder B, a normally closed valve 19 being mounted in the end thereof. The purpose of the valve 19 is to prevent the passage of air from the train-line to the cylinder A while the piston 2 is in its rearmost position. A spring bracket 20 is secured to the face of the piston 2 in such position as to contact with the pin 19′ of the valve 19, when the piston is in its forward position, and thus open the valve for the admission of air into the cylinder A. Air is admitted to the cylinder B, rearward of the piston 2, through an automatic plunger valve which consists of a cylindrical valve casing 21, and a plunger 22 seated and reciprocal therein. One end of the valve casing 21 back of the plunger 22 is connected to the train-line pipes 16, as shown in Fig. 1, the cylinder being "cut in" on the pipe so that the air current in the line may be circulated back of the plunger 22. The opposite end of the valve casing 21 is connected to the head of the cylinder B by a nipple 23, through which air may be admitted to the interior of the cylinder B back of the piston 2 or discharged therefrom, as later described. The plunger 22 in the valve casing 21 is tapered at its inner end and normally abuts against a correspondingly tapered valve seat 24 formed in the casing 21. A helical spring 25 interposed between the back of the casing 21 and the plunger 22 tends to retain the latter in a normally seated position. The plunger 22 is perforated longitudinally at 26 and is provided with a valve 27 which is designed to prevent the passage of air from the cylinder B through the plunger 22, but will permit of the admission of air to the back of the piston 2 from the air-line 16. A series of exhaust ports 28 are formed in the valve casing 21, and are normally kept closed by the valve plunger 22 when the latter is in its seated position.

The operation of the invention is as follows: The piston 2 is shown in the drawings in the position it occupies when the brakes are applied, in which position the air in the train-line is practically exhausted. When it is desired to release the brakes, air under pressure is admitted to the train-line 16 and passes into the valve casing 21 back of the plunger 22. The valve 27 then opens to allow the air to pass through the plunger 22 and enter the cylinder B back of the piston 2 through the nipple 23, so as to cause the piston 2 to move forward in its casing and relieve the brake rod 15 and the brake shoes connected therewith. The valve 19 in the supply pipe 17 in the cylinder A prevents the air under pressure in the train-line 16 from entering the cylinder A. The piston 2 on reaching its forwardmost position, as shown in the dotted lines Fig. 1, opens the valve 19 by reason of the bracket 20 pressing against the valve stem 19'. This permits of air passing from the train-line into the cylinder A, so as to equalize the pressure on each side of the piston 2, when the latter is in its forwardmost position. To set the brakes, the pressure of air in the train-line 16 is reduced by the engineer in any suitable manner. This causes a reduction of air pressure behind the valve plunger 22, which permits of the valve plunger being forced back by the expansion of the air behind the piston 2. The plunger 22 on moving back opens the ports 28, one at a time, thus allowing the air behind the piston 2 to escape. In the meantime, the imprisoned air in the cylinder A expands and forces the piston 2 back into its rearmost position and thus actuates the brake rod 15 to throw on the brakes. As soon as the pressure behind the piston 2 is exhausted, the valve plunger 22 returns to its seated position closing the ports 28 and is then ready for another operation. The check valve 18 prevents the air in the cylinder A from escaping when the pressure in the train-line 16 is reduced. In the event the brake shoes of the brakes (not shown) become worn so that the backward stroke of the piston 2 will not move the rod 15 sufficiently far to throw them in contact with the wheels, the ratchet wheel 6 on the frame 4 is turned a notch or two by reason of the increased stroke of the piston 2 causing it to contact with an engaging arm 29 (Fig. 4.) The backward movement of the piston 2 being limited by the contact of the brake shoes with the wheels, it is evident that as the shoes wear, the length of the piston stroke becomes greater. At such times the ratchet 6, on being rotated by the arm 29, causes the slideway 11 to revolve by means of the pinions 9—10. The crosshead 12 turning with the slideway 11 rotates the threaded rod 13 in such manner as to screw it into the threaded bearing 14 and cause it to enter the tubular piston rod 3 until it is stopped by the end of the rod 15.

As a means of retaining the brakes in a set position, I provide a device for clamping the brake rod 15 to hold it stationary, which by reason of its telescoping with the piston rod 3 permits of the latter being reciprocated while the rod 15 is held in a fixed position. The brake rod clamping means consists of a bracket 30 secured to the head of the cylinder B, the outer end of which is bent at right angles and perforated to engage the rod 15. A pivotally mounted plate 31 on the bracket 30 is also perforated to engage the rod 15 adjacent to the point engaged by the bracket 30. A slot 32 in the plate 31 is adapted to receive a cam or eccentrically mounted disk 33 which is rotatable by any suitable means, such, for instance, as a lever 34. It being desired to lock the brake bar 15 against movement, the plate 31 is rocked on its pivot by means of the cam 33 so as to cause its outer perforated end to bear upon the rod 15 in such manner as to prevent longitudinal movement of the latter. The piston 2 is prevented from rotating in the cylinder B by means of the frame 4, thereon, riding in a slot 35 formed in a fixed member 36 in the cylinder A. By this means the ratchet wheel 6 will remain in alinement with the bracket arm 29 so as to be rotated by the latter, as previously described.

The usual retaining valves and other accessories may be used in conjunction with my air-brake cylinder, if desired, and where found necessary.

By the use of the automatic regulating valve 21, previously described, the engineer has complete control of the backward or brake-setting movement of the piston 2; that is to say, the piston can be caused to move backward slowly, intermittently or continuously, or in emergency can be suddenly impelled backward so as to set the brakes instantly. This is accomplished through the medium of the exhaust ports 28 in the valve casing 21. It will be readily seen that when the pressure is reduced in the train-line 16, as by the opening of the ordinary engineer's valve, a slight amount, the backward movement of the valve plunger 22 will be small or sufficient to open one of the ports 28. Another reduction of pressure will open another port 28, and so on, thus gradually increasing the area of exhaust opening; and thus gradually increasing the movement of the piston 2. In emergency, the air in the train-line 16 is instantly exhausted, thus throwing the valve 22 the limit of its rearward stroke so as to open all the exhaust ports practically simultaneously, thereby immediately setting the brakes.

Having thus described my invention, what I claim and desire to secure by Letters Patent is—

1. An air-brake having a reciprocal piston to actuate a brake rod, and slack-adjusting means on said piston for regulating the stroke of the brake rod.

2. An air-brake having a reciprocal piston for actuating a brake rod, and automatic slack-adjusting means on said piston for regulating the stroke of the brake rod.

3. An air-brake having a reciprocal piston for actuating a brake rod, a slack-adjuster on said piston whereby the stroke of the brake rod is regulated, and means for operating said slack-adjuster.

4. An air-brake having a reciprocal piston for actuating a brake rod, a slack adjuster on said piston whereby the stroke of the brake rod is regulated, and means for automatically actuating said slack-adjuster.

5. An air-brake comprising a brake cylinder, a piston reciprocal in said cylinder, means for subjecting a brake rod to the action of said piston, and means mounted on said piston in the brake cylinder by which the stroke of said brake rod is regulated.

6. An air-brake comprising a brake cylinder, a piston reciprocal in said cylinder, means for subjecting a brake rod to the action of said piston, and means mounted on said piston in the brake cylinder for automatically taking up and adjusting the slack of said brake rod.

7. In an air-brake having a reciprocal piston and a brake rod, the combination of a slack-adjuster on said piston, and means for automatically operating said slack adjuster whereby the stroke of the brake rod is regulated.

8. The combination with an air-brake having a reciprocal piston and a brake rod, of a slack-adjuster on the piston for regulating the stroke of the brake rod, means for reciprocating the piston, and means for automatically operating said slack-adjuster.

9. In an air-brake, the combination of a brake cylinder, a piston reciprocal therein, a brake rod adapted to be actuated by said piston, and a slack-adjuster on said piston for automatically regulating the stroke of said brake rod.

10. In an air-brake, the combination of a brake cylinder, a piston reciprocal therein, a brake rod adapted to be actuated by said piston, a slack-adjuster on said piston for automatically regulating the stroke of said brake rod, and means for reciprocating said piston.

11. In an air-brake, the combination of a brake cylinder, a piston reciprocal therein, means for operating said piston, a brake rod subject to the action of said piston, a slack-adjuster mounted on said piston, and means on said brake cylinder by which said slack-adjuster is actuated to regulate the stroke of said brake rod.

12. In an air-brake, the combination of a brake cylinder, a piston reciprocal therein, means for reciprocating said piston, a tubular piston rod on said piston, a brake rod extending into and slidable in said piston rod, and subject to the action of said piston, a slack-adjuster on said piston adapted to contact with said brake rod, and means on said brake cylinder by which said slack-adjuster is actuated to regulate the stroke of said brake rod.

13. An air brake comprising a brake cylinder composed of two cylinders of different diameters, axially in line with, and open to, each other, a piston reciprocal in the smaller cylinder, a brake rod adapted to be actuated by said piston, a slack-adjuster on said piston, and means in said brake cylinder for automatically actuating said slack-adjuster so as to regulate the stroke of said brake rod.

14. An air brake comprising a brake cylinder composed of a large cylinder and a small cylinder, axially in line with, and open to, each other, a valve regulated air inlet to the large cylinder, a valve controlled combined air inlet and exhaust to said small cylinder, a piston reciprocal in the small cylinder, a brake rod adapted to be actuated by said piston, a slack-adjuster on said piston, and means in said brake cylinder for automatically actuating said slack-adjuster so as to regulate the stroke of said brake rod.

15. An air-brake comprising a brake cylinder composed of a large cylinder and a small cylinder axially in line with, and open to, each other, a piston reciprocal in said small cylinder, means for admitting and imprisoning air in said large cylinder in front of said piston, valve controlled means for admitting and exhausting air from the rear of said piston in said small cylinder, a brake rod adapted to be actuated by said piston, a slack-adjuster on said piston, and means in said brake cylinder for automatically actuating said slack adjuster so as to regulate the stroke of said brake rod.

16. In combination with an air-line, a brake cylinder composed of a large cylinder and a small cylinder axially in line with, and open to each other, a piston reciprocal in the small cylinder, valve controlled means for admitting and imprisoning air in said large cylinder in front of said piston, valve controlled means for admitting and exhausting air from the rear of said piston in said small cylinder, a brake rod adapted to be actuated by said piston, a slack adjuster on said piston, and means in said brake cylinder for automatically actuating said slack-adjuster so as to regulate the stroke of said brake rod.

17. In combination with an air-line, a brake cylinder composed of a large cylinder and a small cylinder axially in line with, and open to, each other, a piston reciprocal in the small cylinder, valve controlled means for admitting and imprisoning air in said large cylinder in front of said piston, means on said piston for operating the air admitting valve, valve controlled means for admitting and exhausting air from the rear of said piston in said small cylinder, a brake rod adapted to be actuated by said piston, a slack-adjuster on said piston, means in said brake cylinder for automatically actuating said slack-adjuster so as to regulate the stroke of said brake rod, and means for engaging and holding said brake rod stationary independent of said piston.

In testimony whereof I have hereunto set my hand in the presence of two subscribing witnesses.

JOHN E. HENRIS.

Witnesses:
  CHARLES A. PENFIELD,
  CHARLES EDELMAN.